Dec. 8, 1925.
T. F. MAY ET AL
1,564,702
TIRE RIM TOOL
Filed April 21, 1925
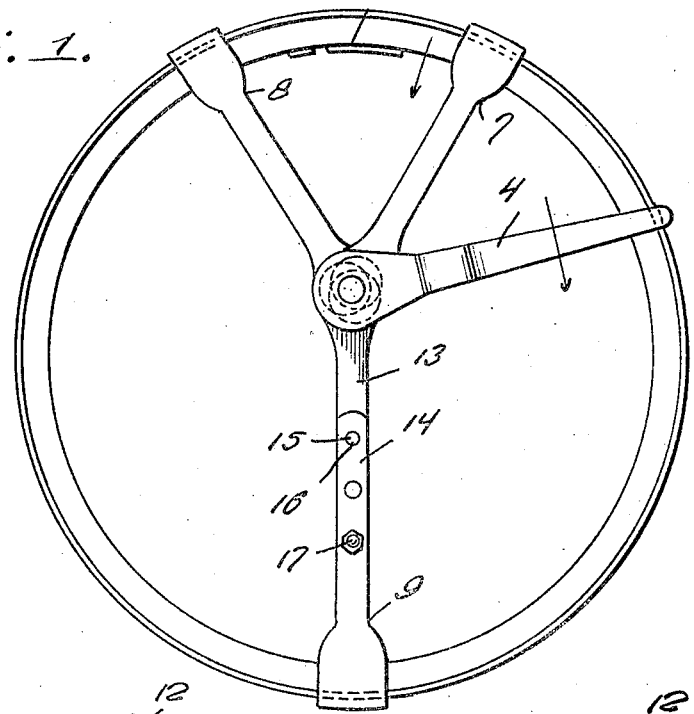
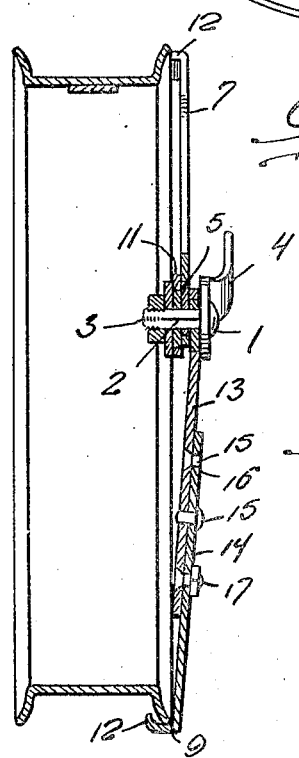
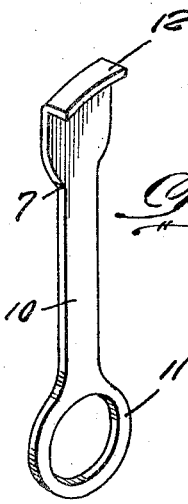
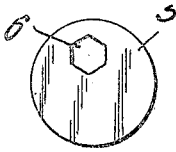
Inventors
T. F. May,
D. C. Perry,
By
Clarence O'Brien
Attorney Patented Dec. 8, 1925.

1,564,702

UNITED STATES PATENT OFFICE.

THOMAS F. MAY AND DE WITT C. PERRY, OF RUTH, NEVADA, ASSIGNORS OF ONE-THIRD TO BARTON E. WALKER, OF RUTH, NEVADA.

TIRE-RIM TOOL.

Application filed April 21, 1925. Serial No. 24,788.

*To all whom it may concern:*

Be it known that we, THOMAS F. MAY and DE WITT C. PERRY, citizens of the United States, residing at Ruth, in the county of White Pine and State of Nevada, have invented certain new and useful Improvements in a Tire-Rim Tool, of which the following is a specification.

The present invention relates to a tire rim tool and has for its principal object to provide a device which is easily manipulated for contracting or expanding a demountable tire rim such as is used upon automobile wheels and the like.

Another important object of the invention is to provide a structure of this nature which includes a plurality of cams for moving arms which are adapted to engage a tire rim so that said tire rim may be expanded or contracted.

A still further object of the invention is to provide a tool of this nature which is possessed of an exceedingly simple structure, which is inexpensive to manufacture, one which is strong, durable, efficient, reliable in operation, not likely to readily get out of order and otherwise well adapted to the purpose for which it is designed.

In the drawing:—

Figure 1 is an elevation of a tire rim showing our tool attached thereto,

Figure 2 is a sectional view taken therethrough,

Figure 3 is a perspective view of one of the arms, and

Figure 4 is a plan view of one of the cam discs.

Referring to the drawing in detail it will be seen that 1 designates a bolt which is provided with a hexagonal shank 2, and a threaded terminal 3, a crank or handle 4 is disposed on the hexagonal shank of the bolt 1 adjacent its head. A plurality of cams 5 are disposed on the hexagonal shank 2 of the bolt 1, in the present instance being three in number. Each cam 5 is in the form of a disc as is shown in Figure 4, being provided with an off center hexagonal opening 6. The three arms are indicated generally by the numerals 7, 8 and 9. Arms 7 and 8 are identical in construction, each consisting of a shank 10 terminating at one end in a ring 11 for receiving the respective cam 5 and at its other end in a rim engaging hook 12. The arm 9 comprises a pair of shank sections 13 and 14 which may be engaged together by pins 15 extending from section 13 through opening 16 in section 14 and also by a bolt and nut 17. Thus it will be seen that the length of the arm 9 may be adjusted by the pin and openings, that is by changing their relative positions. This arm 9 is provided at its inner end with a ring 11, and at its outer end with a hook extension 12. The three cams 5 are mounted on the shank 2 so as to extend in different directions. When the tool is engaged on a rim, as is shown in Figure 1 it will be seen that by swinging the crank 4 in the direction of the arrows, the rim may be compressed as is desirable in taking off the tire shoe. By engaging the hook ends on the inner periphery of the rim and rotating the crank 4 it will be seen that the rim may be expanded.

From the foregoing description it is thought to be obvious that this tool is particularly well adapted for use by reason of its convenience and the facility with which it may be operated in conjunction with the rim. It will also be obvious that our invention is susceptible of some change and modification without departing from the principle and spirit thereof, and for this reason we do not wish to be understood as limiting ourselves to the precise arrangement and formation of the several parts herein shown in carrying out our invention in practice except as hereinafter claimed.

Having thus described the invention, what we claim as new is:—

1. A rim tool of the class described including a non-circular bolt, discs mounted on said bolt to be disposed off center thereof, and to project in different directions, a crank for turning the bolt, and a plurality of arms having rings at their inner ends for receiving the discs.

2. A rim tool of the class described comprising a bolt-non-circular in cross section, a plurality of cams mounted on the bolt and extending in different directions, a plurality of arms having rings at their ends for receiving the cams and hooks at their outer ends for engaging a tire rim, and a crank for turning the bolt in order that the cams may be operated for contracting or expanding the rim with which the arms are engaged.

In testimony whereof we affix our signatures.

THOMAS F. MAY.
DE WITT C. PERRY.